United States Patent Office 3,392,202
Patented July 9, 1968

3,392,202
PREPARATION OF ORGANO-LITHIUM COMPOUNDS IN THE PRESENCE OF CONJUGATED HYDROCARBON DIENES
Ervin G. Pritchett, Cincinnati, Ohio, assignor to National Distillers and Chemical Corporation, New York, N.Y., a corporation of Virginia
No Drawing. Continuation-in-part of application Ser. No. 294,762, July 12, 1963. This application Oct. 24, 1963, Ser. No. 318,504
13 Claims. (Cl. 260—665)

This application is a continuation-in-part of copending application Ser. No. 294,762, filed July 12, 1963, now Patent No. 3,308,110.

The invention relates to an improved process for polymerizing active conjugated dienes. More particularly, the invention relates to an improved catalyst for a process for producing from conjugated dienes polymers having low vinyl unsaturation.

It is known that active conjugated dienes can be polymerized to polymers having low vinyl unsaturation using as a catalyst an organolithium compound or lithium metal that yields organolithium intermediates. Such polymerization, however, is unsatisfactory because the rate is undesirably slow below about 60° C. While polymerization rates increase wtih increasing temperature, at temperatures above about 60° C. the organolithium compound or intermediate undergoes decomposition. This is a disadvantage when high molecular weight linear products with narrow molecular weight distributions are sought or when the product polymers are to be terminated by functional groups via displacement of the terminal lithium.

It is known in the art that the presence of ether in the reaction medium increases the rate of polymerization of conjugated dienes; however, as a consequence of the presence of even small amounts of ether, there is a substantial loss of polymer linearity. Attempts to increase diene polymerization rates without loss of polymer linearity by modifying the organolithium catalyst, for example by addition of a hindered tertiary amine, also have serious disadvantages, among these being an induced loss of active terminal organolithium from the growing polymer chains.

It is an object of this invention to provide an improved catalyst for the polymerization of active conjugated dienes to polymers having low vinyl unsaturation by a process that overcomes the disadvantages of the processes of the prior art.

It is a further object of this invention to provide a novel process for the preparation and stabilization of organolithium compounds.

It is also an object of this invention to provide an improved process for introducing, in a wholly hydrocarbon medium, lithium onto lithium-receptive unsaturated organic compounds.

A still further object of this invention is to provide high purity dilithio compounds in wholly hydrocarbon diluent.

Additional objects will become apparent from the following detailed description.

In the copending application it was shown that active conjugated dienes can be rapidly polymerized to low vinyl (high 1,4-addition) polymers while maintaining complete activity of the anionic terminal lithium to subsequent reaction by using as catalyst a combination of a non-polymerizable diene and lithium metal or an organolithium compound. The polymerization rate is increased significantly without the usual concomitant side effects of increased molecular weight, wider molecular weight distribution, and loss of reactive lithium chain ends. The process is particularly useful for the production of linear or stereoregular rubbers or for the production of highly linear functionalized polymers such as hydroxyl-terminated linear dienes.

The combination of (1) diene that is non-polymerizable via lithium or organolithium catalysis and (2) lithium metal or an organolithium compound is an exceptionally effective catalyst for the polymerization of anionically polymerizable conjugated dienes, said polymerization taking place essentially by 1,4-addition and resulting in liquids or rubbery solids having low vinyl content. The non-polymerizable diene portion (1) of the catalyst does not react with the lithium metal or organolithium compound portion (2) nor does it copolymerize with the polymerizable dienes, thus making it possible and convenient to recover the non-polymerizable diene from the polymerization mixture.

In carrying out the process the polymerizable conjugated diene, e.g., butadiene or isoprene, is contacted with the combination catalyst at normal temperatures and pressures by any convenient method. Preferably a mixture of the non-polymerizing diene and the lithium or organolithium compound is injected as a precombined catalyst combination into a process stream consisting of the polymerizable diene monomer in an inert liquid diluent at normal or slightly elevated temperature and under sufficient pressure to retain the monomer in solution. The temperature and pressure are maintained until the desired degree of polymerization is achieved; the reaction is then terminated. It is also possible to adapt this procedure to a batch or semi-batch operation.

Other possible modes of contacting the monomer with the catalyst include (1) injecting the organolithium compound into a mixture of the polymerizable and non-polymerizing dienes and (2) adding the polymerizable diene to a solution or suspension of the combination catalyst in an inert diluent.

The polymerization process is preferably, although not necessarily, carried out in the presence of an inert liquid reaction medium. Examples include aliphatic and aromatic hydrocarbons, such as pentane, hexane, heptane, heptene-1, isooctane, cyclohexene, cyclohexane, benzene, toluene, xylene, etc.; alkylate; and the like; and mixtures thereof. The amount of diluent may range up to about 20 parts by weight per part of polymer; preferably the range is between about 1 to 6 parts.

It is necessary in carrying out the process that all of the materials used be free of substances that can destroy the organolithium compound, e.g., water; carbon dioxide; oxygen; compounds containing active hydrogen, such as alcohols, esters, primary and secondary amines containing —N—H groups; and the like; that tend to decrease polymer linearity, e.g., ethers; or that tend to destroy polymer functionality, e.g., tertiary amines. The reaction is carried out preferably in an atmosphere of nitrogen or other inert gas, such as argon or helium.

The process is particularly applicable to the polymerization of butadiene and of isoprene, but it applies equally to other active conjugated dienes, such as pentadiene-1,3, 2,3-diphenylbutadiene-1,3, 2,3-dimethyl-1,3-butadiene, 2-chloro-1,3-butadiene, 2,3-dichloro-1,3-butadiene, 2,4-hexadiene, chloro-fluoro-1,3-butadiene, and mixtures of these dienes with each other or with other monomers copolymerizable therewith, as for example aliphatic diolefins, styrene, substituted styrenes, methacrylate esters, e.g., methyl methacrylate, or divinylbenzene.

The non-polymerizing diene portion of the catalyst is a hydrocarbon diene of the empirical formula $C_nH_{2n-2}$ or $C_nH_{2n-4}$ wherein $n$ is an integer ranging from 5 to about 30 and which has one of the following carbon chain structures:

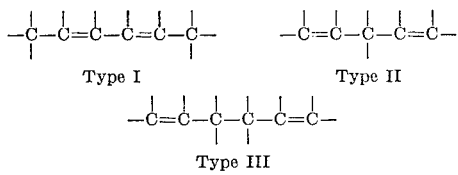

Preferred is a 2,5-dialkylhexadiene-2,4 (Type I), especially 2,5-dimethylhexadiene-2,4. Other dienes not readily polymerized by organolithium compounds, however, also can be used, such as 2,5-dimethylhexadiene-1,5 (Type III), 1,4-dimethylenecyclohexane (Type III, cyclic), cyclohexadiene-1,3 (Type I, cyclic), 1,4-pentadiene (Type II), 1,4-dihydrobenzene (Type II, cyclic), and the like, or mixtures thereof. These dienes may be purified satisfactorily for the purposes of this process by contact with a molecular sieve or by distillation from an organolithium compound.

The organolithium portion of the catalyst can be any alkyl, alkaryl, or cycloalkyl lithium, such as for example butyl lithium, propyl lithium, isobutyl lithium, amyl lithium, cyclohexyl lithium, phenyl ethyl lithium, dilithiopentane, dilithionaphthalene, and the like, or mixtures thereof. It is known that certain organolithium compounds can be prepared in wholly hydrocarbon solvent by reacting lithium metal with the corresponding organohalide. The tendency toward coupling reactions with the organohalide, however, requires the use of large excesses of lithium; consequently, yields are reduced to an extent particularly undesirable in the preparation of dilithio compounds. Previous attempts to prepare organolithium compounds by the direct addition of lithium to unsaturated organic compounds in wholly hydrocarbon solvent have been unsuccessful for several reasons including (a) very slow addition rates of lithium, (b) very low conversion to the organolithium compound, and (c) poor stability of the products. The art specifically stresses the requirement for the use of active ethers as solvents or partial solvents in the addition reaction of alkali metals to active hydrocarbons; this is a major disadvantage because the removal of such ethers from the organolithium products is extremely difficult.

It has now been found that lithium metal can be added to active hydrocarbons in a wholly hydrocarbon diluent at reasonable reaction rates and with high conversions by intimately contacting lithium metal with an organic compound active to lithium addition in the presence of a non-reactive diene hydrocarbon catalyst as described above. The lithium metal is mixed intimately with the organic compound active to lithium addition and with the non-reactive diene hydrocarbon catalyst until essentially complete conversion of the active hydrocarbon to organolithium has taken place. To stabilize organolithium compounds, the non-reactive diene can be added to an organolithium compound in a hydrocarbon medium previously prepared by any convenient means.

The organic compound active to lithium addition can be any organic compound that contains unsaturation active to the addition of alkali metals. More specifically, it is an organic compound containing unsaturation activated by adjacent vinyl or aromatic groups and one that is active to alkali metal addition in ether diluents. Examples of such active organic compounds include naphthalene, biphenyl, anthracene, dimethylfulvene, 1,1-diphenylethylene, stilbene, tetraphenylethylene, 2,6-dimethyl-4-methylene-heptadiene-2,5, 2-phenylpropene-1, 9-furalfulvene, 1,1,3,3-tetraphenylallene, 1,1,3-triphenylpropene-2, benzophenone anil, benzylidene aniline, acridine, acetophenone ketazine, benzophenone hydrazone, azobenzene, styrene oxide, and the like, and mixtures thereof. Of these active compounds, the preferred ones for lithio addition products to be used subsequently in 1,4-type diene polymerizations are completely hydrocarbon, i.e., those that are free of atoms other than carbon and hydrogen.

The dilithio compounds produced by the process of this invention are solids that are only slightly soluble in hydrocarbons. It is preferred, but not essential, that they be in the form of fine suspensions in the non-reactive diene hydrocarbon catalyst or, more preferably, in a mixture of the non-reactive diene and an inert hydrocarbon diluent. Suitable inert diluents are aliphatic, aromatic, or arylaliphatic hydrocarbons, examples of which include pentane, hexane, heptane, cyclohexane, benzene, toluene, xylene, refined kerosene, and the like, and mixtures of these.

Although it is not necessary, in order to obtain optimum reaction rates in the addition of lithium to active unsaturated compounds, the metal is mixed with the unsaturated compound by grinding. Any suitable means may be employed; for example, a ball mill equipped with steel balls or rods or a stirred vessel known as an attritor may be used. It is also possible to use other means of violent agitation, such as an ultrasonic mixer, in any suitable vessel.

As stated above, in order to prevent reactions with impurities, all reaction vessels, grinding balls, mixing equipment, and the like that contact the reactants should be thoroughly dry and protected by an inert atmosphere such as nitrogen, argon, helium, or the like.

Fine suspensions of dilithium product easily transferable in a fluid state are produced by having the dilithium product within the concentration range of about 0.01 to 2.0 grams of lithium per 100 parts of diluent; preferably the amount of lithium ranges from about 0.05 to 1.0 gram per 100 parts of diluent.

The amount of the non-reactive hydrocarbon diene catalyst can vary from about 0.01 up to about 10,000 parts per part of lithium, the use of the non-reactive diene catalyst as diluent not being excluded. It is preferred, however, to use from about 0.05 up to about 100 parts of the non-reactive diene per part of lithium or, in other words, from about 0.1 to about 5 moles of non-reactive diene catalyst per equivalent of lithium.

The temperature at which the lithium is added to the lithium-receptive unsaturated organic compound can range from about −30° up to about 100° C., and the temperature employed is preferably between about 0° and 60° C.

The stable high purity dilithio compounds in wholly hydrocarbon diluent prepared by the process of this invention are useful in the polymerization of polymerizable diene hydrocarbons to linear (low vinyl unsaturation) polymers such as cis-polyisoprene rubber. The dilithio compounds are useful also in the manufacture of block and graft copolymers of polymerizable diene hydrocarbons, styrenes, acrylate and methacrylate esters, and the like. They are particularly useful in the preparation of dihydroxyl-terminated polydienes having vinyl to internal unsaturation ratios of one or less, as disclosed in copending application Ser. No. 305,227 (filed Aug. 28, 1963), now Patent No. 3,308,170, issued Mar. 7, 1967.

The concentration of total catalyst can range from about 0.001 up to about 10 mole percent, based on the weight of the polymerizable diene. High molecular weight rubbers are produced at the lower catalyst concentrations, whereas useful oils or functionalized fluid polymers are produced at higher catalyst levels. A range of from about 0.01 to about 5 mole percent is preferred.

The polymerization temperature in general can range from about −20° up to about 100° C., but a temperature between about 25° and about 60° C. is preferred. The preferred pressure range is between about 1 and about 2 atmospheres, although it is possible to employ a pressure between less than 1 and up to about 9 atmospheres.

The resulting polymers are valuable as raw materials for plastics, rubbers, foams, coatings, and the like. Particularly valuable are the carboxyl and hydroxyl compounds which are obtained when the lithium-terminated polymers are reacted with suitable compounds, such as carbon dioxide or an epoxide, for example, an aliphatic epoxide such as ethylene oxide, propylene oxide, or the butylene oxides or an aromatic epoxide such as styrene oxide. The reactant may also be a suitable carbonyl-type compound, such as for example aldehydes, such as formaldehyde, paraformaldehyde, acetaldehyde, propionaldehyde, butyraldehyde, isobutyraldehyde, and the octylaldehydes, e.g., 2-ethylhexaldehyde. Aromatic and heterocyclic aldehydes such as benzaldehyde and furfural can also be used, as can such aldehydes as salicylaldehyde, anisaldehyde, cinnamaldehyde, piperonal, vanillin, acrolein, and crotonaldehyde. Carbonyl compounds of the ketone class also can be employed, for example, acetone, methyl ethyl ketone, diethyl ketone, acetophenone, benzophenone, methyl vinyl ketone, mesityl oxide, phorone, and benzoquinone. It is also possible to produce hydroxyl compounds from the lithium-terminated polymers by oxidizing them with oxygen itself, either as pure oxygen or admixed with inert materials, such as in dry air. Ozone also can be used as well as oxidizing materials that yield oxygen or its oxidizing equivalents. These include sodium peroxide, hydrogen peroxide, the persulfates, and other organic and inorganic peroxides, metal peroxides, nitrogen oxides, nitro-aromatic compounds such as nitrobenzene, and some metal salts.

At least one equivalent of the hydroxyl-forming reactant is required for each lithium equivalent of the polymer, and in order to insure complete reaction an excess of the reactant is usually employed. When using an epoxide, for example, the excess may be up to about 500 percent; it is preferably from about 10 percent up to about 150 percent.

The reaction with the hydroxyl-forming compound, for example as in the case of using an epoxide, is followed by treating the lithium salts of the resulting corresponding hydroxyl compounds with a hydrolyzing agent, e.g., water, an alcohol such as methanol or ethanol, etc., to destroy any unreacted lithium and to liberate the hydroxyl compounds from their lithium derivatives that are initially formed. The hydroxyl compounds are isolated from this reaction mixture by extraction, distillation, or other suitable means.

The reaction of the polymer with the appropriate hydroxyl- or carboxyl-forming compound is generally carried out at a temperature between about the reflux temperature of the selected reaction medium and about $-60°$ C. or lower; the temperature is preferably between about the reflux temperature and about $-40°$ C.

Here too it is important that the presence of moisture and compounds containing active hydrogen be carefully controlled in order to prevent premature loss of terminal lithium groups. It is also necessary that other reactive materials be excluded; therefore, the reaction should be conducted in an inert atmosphere such as nitrogen, argon, helium, or the like.

Other than being treated to produce polymeric acids or alcohols as aforedescribed, the polymers can be reacted with other compounds to give a wide range of products. For example, they can be reacted with a Grignard-type reactant having carbonyl, thionyl, or nitrile groups. Typical examples of such reactants are sulfur dioxide, benzene sulfonyl chloride, thionyl chloride, acetonitrile, propionitrile, and the like. In addition, reactions with halides, dihalides, trihalides, and tetrahalides, particularly chlorides, bromides, and iodides, are suitable, as are reactions with organic compounds such as alkylaryl, acetylenic, nitrile, and cyclodienyl compounds and reactions with combinations of the above reactants.

Although the utility of the organolithium compounds of the present invention is being illustrated with the formation of di-functional polydienes, it is not intended to limit their utility thereto.

In the following examples analyses of reaction mixtures were derived by combining the results of two operations which determined (a) unreacted lithium and (b) total alkali. Unreacted lithium generally was measured by decomposing a suitable-sized sample of the reaction mixture with dry butyl Cellosolve (ethylene glycol monobutyl ether) in an oil-sealed gasometer which measured up to 50 ml. of evolved hydrogen to an accuracy of about 0.02 ml. Following the measurement of the evolved hydrogen, the alcohol-decomposed sample was titrated to the phenolphthalein end point with 0.1 N sulfuric acid. Unreacted lithium was defined by $$L = vfg/11.2G \text{ milliequivalents}$$

where L is unreacted lithium, $v$ is milliliters of evolved hydrogen, $g$ is grams of sample, G is grams of total reaction mixture, and $f$ is a factor for reducing $v$ to normal conditions (0° C. and 760 mm.). The factor $f$ may be found tabulated in Lange's "Handbook of Chemistry" (Handbook Publishers Inc., Sandusky, Ohio).

Total alkali (T) was defined by $$T = VNg/G \text{ milliequivalents}$$

where V is milliliters, N is the exact normality of the titrating acid, $g$ is grams of sample, and G is grams of total reaction mixture; thus both L and T are defined by the identical sample.

In some cases L was determined by the known Gilman-Haubein titration, and such values are so designated where used. This method is not preferred, however, because it requires separate samples for the determination of L and of T.

From the values of L and T various values describing the completion of reaction at any time $t$ between lithium and a reactive hydrocarbon or an organohalide can be derived. In the following equations $a$ is (1) moles of hydrocarbon which can add two milliequivalents of lithium or (2) milliequivalents of organohalide reactant; $2a+c$ is milliequivalents of lithium; and $n$ is $a$ or $(2a+c)/2$, whichever is smaller; all are at $t=0$. Thus at time $t$:

$$\text{Percent of theory Li used} = \frac{(2a+c)-L}{2n} \times 100$$

and $$\text{Percent of theory C-Li bonds formed} = \frac{T-L}{n} \times 100$$

When reaction with organohalide (R-X) is considered, $$\text{Percent of theory R-X used} = \frac{(2a+c)-T}{n} \times 100$$

and

Percent of theory R-X lost to Wurtz reaction=

$$\frac{(2a+c)-(2T-L)}{n} \times 100$$

The utility of these analyses and derived values will be apparent in the following examples in which, unless otherwise specified, all parts are by weight and all reactions took place at ambient temperature. It is to be understood that these examples are for purposes of illustration and not for limitation.

EXAMPLE I

Reactors were 8-ounce glass bottles containing about 480 parts (about 40 volume percent) of ⅛-inch stainless steel grinding balls. Each bottle was sealed by a neoprene disc held firmly in place with a punctured metal screw cap. The reactors were thoroughly oven-dried prior to use and were swept with dry argon while cooling. Reactants and diluent were entered, the reactors were sealed while an argon atmosphere was maintained, and milling was accomplished by rotating the reactors at 100 r.p.m. about the vertical axes. Samples for analysis were withdrawn into suitable hypodermic syringes for transfer.

In a series of runs each using 0.423 part of lithium metal as a 30 percent dispersion in paraffin wax and 5.40 parts of scintillation-grade trans-stilbene, the reactants were milled together in a total of 50 parts by volume of the diluents shown in Table 1 for the length of time given and then analyzed.

TABLE 1.—ADDITION OF LITHIUM TO STILBENE

| Run | Diluent, volume percent | Hours Milled | Li Reacted, percent theory |
|---|---|---|---|
| 1 | n-Heptane (100) | 144 | 65.8 |
|   |                 | 216 | 83.5 |
| 2 | TMB [1] (100) | 20 | 96.5 |
| 3 | n-Heptane (99.8) | 6 | 69.2 |
|   | TMB [1] (0.2) |   | [2] 69.5 |
| 4 | n-Heptane (98) | 6 | 85.6 |
|   | TMB [1] (2) |   | [2] 85.2 |
| 5 | n-Heptane (90) | 6 | 90.5 |
|   | TMB [1] (10) |   |   |
| 6 | n-Heptane (80) | 6 | 89.0 |
|   | TMB [1] (20) |   |   |

[1] TMB = 2,5-dimethylhexadiene-2,4.
[2] Second analysis by Gilman-Haubein method.

From the above data it is evident that in the presence of 2,5-dimethylhexadiene-2,4 the rate of reaction of a compound active to the addition of lithium is increased.

EXAMPLE II 0.457 part of lithium metal as a dispersion in paraffin wax and 5.405 parts of trans-stilbene were milled together as in Example I, using as diluent a mixture of 51 parts of n-heptane and 20 parts of 2,5-dimethylhexadiene-2,4. Within 20 hours 99.5 percent of theory lithium had reacted. The reaction mixture, a thick black suspension, was transferred to a stirred, round-bottom flask and further reacted with 5 parts of ethanol. 25 parts of water was added, the mixture was acidified to pH 1 with concentrated hydrochloric acid, and the organic layer was washed with water to pH 6 and dried over calcium sulfate. Upon evaporation of the organic diluent, 5.33 parts (95 percent) of slightly damp crystals melting at 50°–54° C. remained. Recrystallization from acetone-water gave 1,2-diphenylethane; melting point alone and mixed with an authentic sample was 54° C.

EXAMPLE III

In each of two runs 0.437 part of lithium metal as a dispersion in paraffin wax and 3.842 parts of naphthalene (twice recrystallized from ethanol and thoroughly vacuum-dried) were milled as in Example I. In one run 68 parts of n-heptane was used as the diluent; in the other run a mixture of 51 parts of n-heptane and 20 parts of 2,5-dimethylhexadiene-2,4 was used. Samples were removed at various times for analyses. The results are given in Table 2.

TABLE 2.—RELATIVE STABILITY OF DILITHIONAPHTHALENE IN HYDROCARBONS

| Run | Diluent, volume percent | Hours Milled | Li Reacted, percent theory |
|---|---|---|---|
| 7 | n-Heptane (100) | 4 | 66.1 |
|   |                 | 28 | 63.4 |
|   |                 | 54 | 42.4 |
|   |                 | 144 | 13.0 |
|   |                 | 246 | 2.0 |
| 8 | n-Heptane (74) | 4 | 79.2 |
|   | TMB [1] (26) | 6 | 81.2 |
|   |              | 23 | 92.0 |
|   |              | 54 | 92.3 |

[1] TMB = 2,5-dimethylhexadiene-2,4.

In the absence of 2,5-dimethylhexadiene-2,4 the dilithionaphthalene initially formed was unstable and an apparent reaction of only 2 percent resulted after 246 hours. In the presence of 2,5-dimethylhexadiene-2,4 the dilithionaphthalene was formed in nearly quantitative yield and was stable.

EXAMPLE IV 0.437 part of lithium metal as a dispersion in paraffin wax and 3.842 parts of naphthalene were milled as in Example I, using a mixture of 65 parts of benzene and 20 parts of 2,5-dimethylhexadiene-2,4 as diluent. In 5 hours 85.9 percent reaction had occurred; in 23 hours, 95.4 percent.

EXAMPLE V 0.44 part of an alloy of 1 percent of sodium in lithium metal dispersed in paraffin wax and 3.842 parts of naphthalene were milled as in Example I, using as diluent a mixture of 51 parts of n-heptane and 20 parts of 2,5-dimethylhexadiene-2,4. In 5 hours 95.5 percent of the theoretical alkali metal alloy had reacted.

EXAMPLE VI

The procedure of Example I was repeated using 0.456 part of lithium metal as a dispersion in paraffin wax and 3.845 parts of naphthalene reactant. The diluent was a mixture of 51 parts of n-heptane and 20 parts of 2,5-dimethylhexadiene-2,4. After 24 hours milling time, analysis indicated 93.5 percent reaction. The product was further reacted with ethanol as in Example II, but the dried organic layer was concentrated by distillation to about 15 percent solids. This solution was compared in vapor pressure chromatography with one of dihydronaphthalene prepared by the known sodium-alcohol reduction of naphthalene. Dihydronaphthalene prepared via the lithium derivative of this example analyzed for 62.3 percent of 1,4- and 36.4 percent of 1,2-dihydronaphthalene.

EXAMPLE VII

The procedure of Example I was repeated using 0.208 part of lithium metal as a dispersion in paraffin wax and 5.45 parts of 1,1-diphenylethylene. The diluent was a mixture of 13.6 parts of n-heptane and 15.4 parts of 2,5-dimethylhexadiene-2,4. In 25 hours milling time 75 percent of the lithium had reacted.

EXAMPLE VIII 0.421 part of lithium metal as a dispersion in paraffin wax, 3.61 parts of styrene oxide, and 0.011 part of trans-stilbene (to reduce the time of initiation of the reaction) together with a mixture of 30 parts of n-heptane and 3.8 parts of 2,5-dimethylhexadiene-2,4 as diluent were milled as in Example I. The reaction started in about 4 hours, as evidenced by color formation. After 24 hours milling time the resulting brown suspension was sampled and analyzed. 89.2 percent of the theoretical reaction of lithium had taken place.

EXAMPLE IX 0.455 part of lithium metal and 5.752 parts of azobenzene were mixed with 51 parts of n-heptane and 20 parts of 2,5-dimethylhexadiene-2,4 and milled. Analysis of the resulting green suspension at 24, 41, and 96 hours showed the completion of reaction at these times to have been 89.1, 92.5, and 96.5 percent, respectively. The product was further reacted with ethanol, washed with acid and water, and isolated by evaporation by the method of Example II, the product being protected by a nitrogen atmosphere. 5.05 parts (100 percent) of crude product melting at 120°–125° C. was recovered. Recrystallization from ethanol gave hydrazobenzene, M.P. 127° C., a white solid which darkened in air.

EXAMPLE X 0.417 part of lithium metal as a dispersion in paraffin wax and 5.40 parts of trans-stilbene were milled as in Example I, using as diluent a mixture of 54.5 parts of n-heptane and 16.5 parts of 2,5-dimethylhexadiene-1,5 ($n_D^{25}$=1.4291). Within 12 hours 92 percent of the lithium metal had reacted.

EXAMPLE XI

To illustrate that the rate of addition of lithium metal to active hydrocarbons can be adjusted by the choice of hydrocarbon diluent-catalyst combination, four runs were made. In each run 0.43 part of lithium metal as a dispersion in paraffin wax and 5.40 parts of trans-stilbene were milled as in Example I, using the diluents and obtaining results as follows:

TABLE 3

| Run | Diluent, parts | Lithium reacted at 6 hours, percent | Time required for 95 percent completion of lithium addition, hours |
|---|---|---|---|
| 9 | n-Heptane (68) | 5 | (¹) |
| 10 | 2,5-dimethylhexadiene-2,4 (77) | 28 | 20.5 |
| 11 | n-Heptane (54.5) 2,5-dimethylhexadiene-1,5 (17.1) | 44 | 13 |
| 12 | n-Heptane (54.5) 2,5-dimethylhexadiene-2,4 (17.1) | 95 | 6 |

¹ Only 75 percent reaction had occurred at 200 hours.

EXAMPLE XII

To illustrate the utility of added non-polymerizing dienes as stabilizers for organolithium formed by methods other than the direct addition of lithium metal to compounds containing activated olefinic unsaturation, the following runs were made:

In each of two runs 0.415 part of lithium metal as a dispersion in paraffin wax and 2.12 parts of pentamethylene dichloride were milled in bottle reactors as described in Example I.

The diluent for run 13 was 37 parts of n-heptane and for run 14, a mixture of 37 parts of n-heptane and 0.38 part of 2,5-dimethylhexadiene-2,4. Analytical results at various milling times, using the Gilman-Haubein method, are presented in Table 4.

TABLE 4.—STABILIZATION OF PENTAMETHYLENE DILITHIUM

| Run | Analysis for percent of— | Milling Time, hours | | |
|---|---|---|---|---|
| | | 6 | 24 | 172 |
| 13 | Li used | 48.9 | 60.4 | 51.0 |
| | C-Li bonds formed | 33.0 | 17.3 | 0.8 |
| | R=Cl used | 64.7 | 103.0 | 96.5 |
| | Wurtz Coupling | 31.7 | 86.0 | 95.7 |
| 14 | Li used | 53.3 | 55.4 | 56.0 |
| | C-Li bonds formed | 44.8 | 11.7 | 12.3 |
| | R-Cl used | 61.5 | 99.0 | 100.0 |
| | Wurtz Coupling | 16.8 | 87.5 | 88.0 |

Although the Gilman-Haubein "double titration" method is recognized to be accurate only to ±5 percent, run 14 using a non-polymerizing diene shows results that are significantly better than those of run 13 where no diene was used. For example, the large loss of carbon-lithium species and the concurrent increase in Wurtz coupling reactions, etc., at between 24 and 172 hours milling time found in run 13 were eliminated in run 14.

EXAMPLE XIII

The utility of the lithio compounds in wholly hydrocarbon diluent is illustrated as follows:

Dilithionaphthalene was prepared as in Example IV, using 0.43 part of lithium metal, 3.842 parts of naphthalene, and a mixture of 51 parts of n-heptane and 20 parts of 2,5-dimethylhexadiene-2,4. In 23 hours milling time 92 percent addition reaction had occurred.

The dilithionaphthalene was transferred along with 68 parts of n-heptane rinse to a 500-ml. round-bottom flask equipped with thermometer, high-speed stirrer, Dry Ice condenser, and inlets for argon and butadiene. An argon atmosphere was maintained throughout. To the well-stirred dark-purple suspension was added 46.75 parts of butadiene-1,3 at about 50° C. and at such a rate that active reflux was maintained without lowering the temperature below 46° C. During polymerization, partial precipitation of the polymer occurred, and stirring was difficult. At the end of the addition, a thick polymer-solvent mass was produced. The mixture was cooled to −20° C., 50 parts by volume of cold 1,2-dimethoxyethane was added to thin and dilute the mixture, and about 5 parts of liquid ethylene oxide was injected all at once with rapid agitation. Within 1 to 2 minutes, the mixture solidified.

After overnight standing, about 20 parts of powdered Dry Ice was worked into the reaction mixture, followed by 10 parts of ethanol which fluidized the semi-solid mass. The mixture was acidified to pH 1 with aqueous oxalic acid, washed with water to pH 6, dried over anhydrous calcium sulfate, and stabilized to oxidation with 0.1 part of t-butyl catechol. After filtration followed by evaporation of volatiles to 100° C./0.5 mm., there resulted 41.5 parts of a light yellow oil having a viscosity of 37 poises/25° C., a hydroxyl number of 44.92, an acid number of 1.46, and a ratio of vinyl to internal unsaturation of 32 to 68 as determined by nuclear magnetic resonance (NMR) analysis using the method of Hung Yu Chen (Anal. Chem. 34, 1134 (1962)).

The glycol or difunctional nature of the product oil was demonstrated by mixing it with a 10 percent excess of toluene diisocyanate and curing the mixture for 6 hours at 130° C. in an oven. The resulting polyurethane elastomer had little tackiness and evidenced reasonable strength and elasticity when pulled by hand.

It should be noted that a polybutadiene glycol of equivalent molecular weight produced in an ether solvent would have about 60 to 80 percent vinyl unsaturation and viscosity of about 300 to 500 poises, whereas the product prepared in a wholly hydrocarbon medium by the process of this invention has only about 30 percent vinyl unsaturation and the remarkably low viscosity of 37 poises.

EXAMPLE XIV

This example illustrates both the high activity obtainable with non-polymerizing diene cocatalysts and the precautions necessary in their use.

76.8 parts of 2,5-dimethylhexadiene-2,4 and 45.4 parts of butadiene-1,3 were placed in a dry, argon-filled 8-ounce screw cap bottle at about −15° C. The bottle was sealed with a neoprene disk under the screw cap. While the contents were chilled, 0.2 part of butyl lithium as a 1.55 N solution in heptane was injected into the bottle which was then submerged and agitated in a 30° C. water bath behind a safety screen. After about 5 minutes the bottle exploded, depositing a solvent-wet polymer mass into the bath and onto nearby surfaces, indicating that polymerization had occurred with extreme rapidity. At high cocatalyst concentrations it is, therefore, preferred to add monomer to the catalyst-cocatalyst combination.

While there are above disclosed but a limited number of embodiments of the invention herein presented, it is possible to produce still other embodiments without departing from the inventive concept herein disclosed. It is desired, therefore, that only such limitations be imposed on the appended claims as are stated therein.

What is claimed is:

1. In a process for the preparation of organolithium compounds comprising reacting lithium metal with an organic compound containing unsaturation active to lithium addition, the improvement comprising conducting said reaction in the presence of a non-polymerizing, conjugated hydrocarbon diene.

2. The process of claim 1 wherein the non-polymerizing, conjugated, hydrocarbon diene has a formula selected from the group consisting of $C_nH_{2n-2}$ and $C_nH_{2n-4}$ wherein $n$ is an integer ranging from 6 to about 30.

3. The process of claim 1 wherein the diene is a 2,5-dialkylhexadiene.

4. The process of claim 3 wherein the 2,5-dialkylhexadiene is 2,5-dimethylhexadiene-2,4.

5. The process of claim 1 wherein the ratio of diene to lithium ranges from about 0.01 to about 10,000 parts of diene per part of lithium.

6. The process of claim 1 wherein the reaction temperature is in the range of about −30° C. to about 100° C.

7. In a process for the preparation of organolithium compounds comprising reacting lithium metal with an organic compound containing unsaturation active to lithium addition in the presence of a hydrocarbon diluent, the improvement comprising substituting for at least a portion of said hydrocarbon diluent a non-polymerizing, conjugated, hydrocarbon diene.

8. The process of claim 7 wherein the non-polymerizing, conjugated, hydrocarbon diene has a structural formula selected from the group consisting of $C_nH_{2n-2}$ and $C_nH_{2n-4}$ wherein $n$ is an integer ranging from 6 to about 30.

9. The process of claim 7 wherein the diene is a 2,5-dialkylhexadiene.

10. The process of claim 9 wherein the 2,5-dialkylhexadiene is 2,5-dimethylhexadiene-2,4.

11. The process of claim 7 wherein the ratio of the diene to lithium ranges from about 0.01 to about 10,000 parts of diene per part of lithium.

12. The process of claim 7 wherein the reaction temperature is in the range of about $-30°$ C. to about $100°$ C.

13. The process of claim 7 wherein the hydrocarbon diluent is heptane.

References Cited

UNITED STATES PATENTS

| | | | |
|---|---|---|---|
| 3,159,587 | 12/1964 | Uraneck et al. | 252—431 |
| 2,559,947 | 7/1951 | Crouch | 260—94.2 |
| 3,055,952 | 9/1962 | Goldberg | 260—665 |

TOBIAS E. LEVOW, *Primary Examiner.*

HELEN M. McCARTHY, *Examiner.*

E. C. BARTLETT, A. P. DEMERS, *Assistant Examiners.*